US011838354B1

(12) United States Patent
Mehrotra et al.

(10) Patent No.: US 11,838,354 B1
(45) Date of Patent: Dec. 5, 2023

(54) TECHNIQUES FOR OVERRIDING LIBRARIES FOR WORKLOADS IN A CLOUD-COMPUTING ENVIRONMENT

(71) Applicant: Microsoft Technology Licensing, LLC, Redmond, WA (US)

(72) Inventors: Sanjeev Mehrotra, Kirkland, WA (US); Abhishek Udupa, Kirkland, WA (US); Vaibhav Pradeep Bhosale, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/804,737

(22) Filed: May 31, 2022

(51) Int. Cl.
*H04L 67/10* (2022.01)
(52) U.S. Cl.
CPC .................. *H04L 67/10* (2013.01)
(58) Field of Classification Search
CPC ...................................................... H04L 67/10
See application file for complete search history.

(56) References Cited

U.S. PATENT DOCUMENTS

| | | | |
|---|---|---|---|
| 10,623,390 B1 * | 4/2020 | Rosenhouse | H04L 67/10 |
| 2020/0403868 A1 * | 12/2020 | Punathil | H04L 41/0823 |
| 2021/0021883 A1 * | 1/2021 | Parekh | H04N 21/237 |
| 2021/0133000 A1 | 5/2021 | Okman | |
| 2021/0357238 A1 | 11/2021 | Kirmse et al. | |
| 2022/0019452 A1 | 1/2022 | Levin et al. | |

OTHER PUBLICATIONS

"International Search Report and Written Opinion Issued in PCT Application No. PCT/US23/018260", dated Jul. 21, 2023, 10 Pages.
Sayfan, Gigi, "Mastering Kubernetes", Published by Packt Publishing Ltd, May 25, 2017, 400 Pages.

* cited by examiner

*Primary Examiner* — Hua Fan
(74) *Attorney, Agent, or Firm* — ARENTFOX SCHIFF LLP (57) ABSTRACT

Described are examples for overriding a library used by a workload in a cloud-computing environment including initializing a container for a workload that includes an entry point that points to a binary to be executed by the container, causing the workload to load, based on initializing the container, an override library into the container before executing the binary, where the override library includes an override function having a function signature of a function provided by the library, and instructing the workload to execute the binary in the container, where the binary calls the function using the function signature causing the override function in the override library to be called in place of the function.

20 Claims, 4 Drawing Sheets

TECHNIQUES FOR OVERRIDING LIBRARIES FOR WORKLOADS IN A CLOUD-COMPUTING ENVIRONMENT

BACKGROUND

Cloud-computing environments are provided for distributed storage and access of software (e.g., services or other applications), files, data, etc. across multiple devices connected via a network, such as the Internet. Using distributed nodes to store data and/or allow execution of the software can improve reliability of the software and data through redundancy, improved on-demand access of the software and data from various other nodes in the network, more efficient execution of software or retrieval of data by using certain nodes or services in the network, and/or the like. A cloud-computing environment can include one or more compute clusters that provide one or more functions. The compute clusters can include a workload that executes on one or more nodes to provide redundant functionality, and a load balancer or router that can balance requests across workloads or route requests based on a characteristic (e.g., an identifier in the request that is associated with one of the workloads). In one specific example, cloud-computing environments can be used to provide mobile edge computing (MEC) where certain functions of a mobile network can be provided as workloads on nodes in the cloud-computing environment.

In MEC, a centralized unit (CU) can be implemented in a back-end node, one or more distributed units (DUs) can be implemented in intermediate nodes, and various remote units (RU), which can provide at least physical (PHY) and/or media access control (MAC) layers of a base station or other radio access network (RAN) node of the mobile network, can be deployed at edge serves. The RUs can communicate with the CU via one or more DUs. In an example, the DUs can provide higher network layer functionality for the RAN, such as radio link control (RLC) or packet data convergence protocol (PDCP) layer functions. The RUs can facilitate access to the CU for various downstream devices, such as user equipment (UE), Internet-of-Things (IoT) devices, etc. In addition, the CU, DUs, RUs, or portions thereof, may each execute as a workload on nodes of the cloud-computing environment and/or in a given compute cluster thereof.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method for overriding a library used by a workload in a cloud-computing environment is provided. The method includes initializing a container for a workload that includes an entry point that points to a binary to be executed by the container, causing the workload to load, based on initializing the container, an override library into the container before executing the binary, where the override library includes an override function having a function signature of a function provided by the library, and instructing the workload to execute the binary in the container, where the binary calls the function using the function signature causing the override function in the override library to be called in place of the function.

In another example, a device for overriding a library used by a workload in a cloud-computing environment is provided that includes a memory storing one or more parameters or instructions for deploying workloads in the cloud-computing environment, and at least one processor coupled to the memory. The at least one processor is configured to initialize a container for a workload that includes an entry point that points to a binary to be executed by the container, cause the workload to load, based on initializing the container, an override library into the container before executing the binary, where the override library includes an override function having a function signature of a function provided by the library, and instruct the workload to execute the binary in the container, where the binary calls the function using the function signature causing the override function in the override library to be called in place of the function.

In another example, a non-transitory computer-readable medium is provided that stores instructions thereon that, when executed by at least one computing device, causes the at least one computing device to perform operations for overriding a library used by a workload in a cloud-computing environment. The operations include initializing a container for a workload that includes an entry point that points to a binary to be executed by the container, causing the workload to load, based on initializing the container, an override library into the container before executing the binary, where the override library includes an override function having a function signature of a function provided by the library, and instructing the workload to execute the binary in the container, where the binary calls the function using the function signature causing the override function in the override library to be called in place of the function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to loading libraries for use by workloads deployed in a cloud-computing environment. In some aspects, multiple active workloads of a process can be deployed and can call one or more libraries that are loaded by the workloads. The one or more libraries may provide callable functions that can be leveraged by the workloads. In accordance with aspects described herein, the one or more libraries can be override with an override library that can modify the functionality of one or more of the functions exposed by the library. One example of a library can include a network communication library, such as a sockets library, which allows a binary that imports the library to establish network connectivity with other network nodes. Some sockets libraries use user datagram protocol (UDP) as the mechanism for establishing connectivity with another node, sending and receiving communications, etc. There may be other mechanisms, technologies, etc., however, that are more efficient for network connectivity than UDP, such as data plane development kit (DPDK), a remote direct memory access (RDMA), a shared memory, etc. To the extent these more efficient mechanisms can be leveraged in certain scenarios, the sockets library can be overridden with an override library that instead uses a more efficient mechanism.

In accordance with aspects described herein, a container for a workload can be initialized, and the override library can be loaded in front of the one or more libraries to be overridden. The override library, for example, can include an override function that has the same function signature as a function in the one or more libraries to be overridden. For example, the override function can have the same function name, the same input parameter type and/or parameter name, etc. For example, for a sockets library, the override function in the override library can include at least one of a send function, a receive function, a socket function, or a bind function, which can be overridden to use DPDK, RDMA, shared memory, etc., instead of the generic UDP functionality of the sockets library.

In an aspect, the override library can be loaded before the binary is called to execute in the container. For example, the override library can be stored in a shared library storage, and the workload can be provide with a volume mount to the shared library storage. In an aspect, the entry point of the container, which may point to the binary, can be modified to point to a script that loads the override library (e.g., from the shared library storage) instead of the one or more libraries to be overridden. Once the override library is loaded, in an aspect, the binary can be executed in the container and can use the override functions of the override library.

Allowing for overriding libraries in this regard can facilitate improving functions used by the workloads to be more efficient in resource utilization and/or speed. For example, using an override library that leverages DPDK, RDMA, shared memory, etc. instead of UDP can enhance performance of network communications between workloads by improving latency from being on the order of milliseconds to being on the order of microseconds. This can allow the workloads to be used for various functions that may require low latency, such as different workloads performing different network stack functions (e.g., a first workload performing physical layer functions, a second workload performing media access control (MAC) layer functions, etc.).

Figure 1:
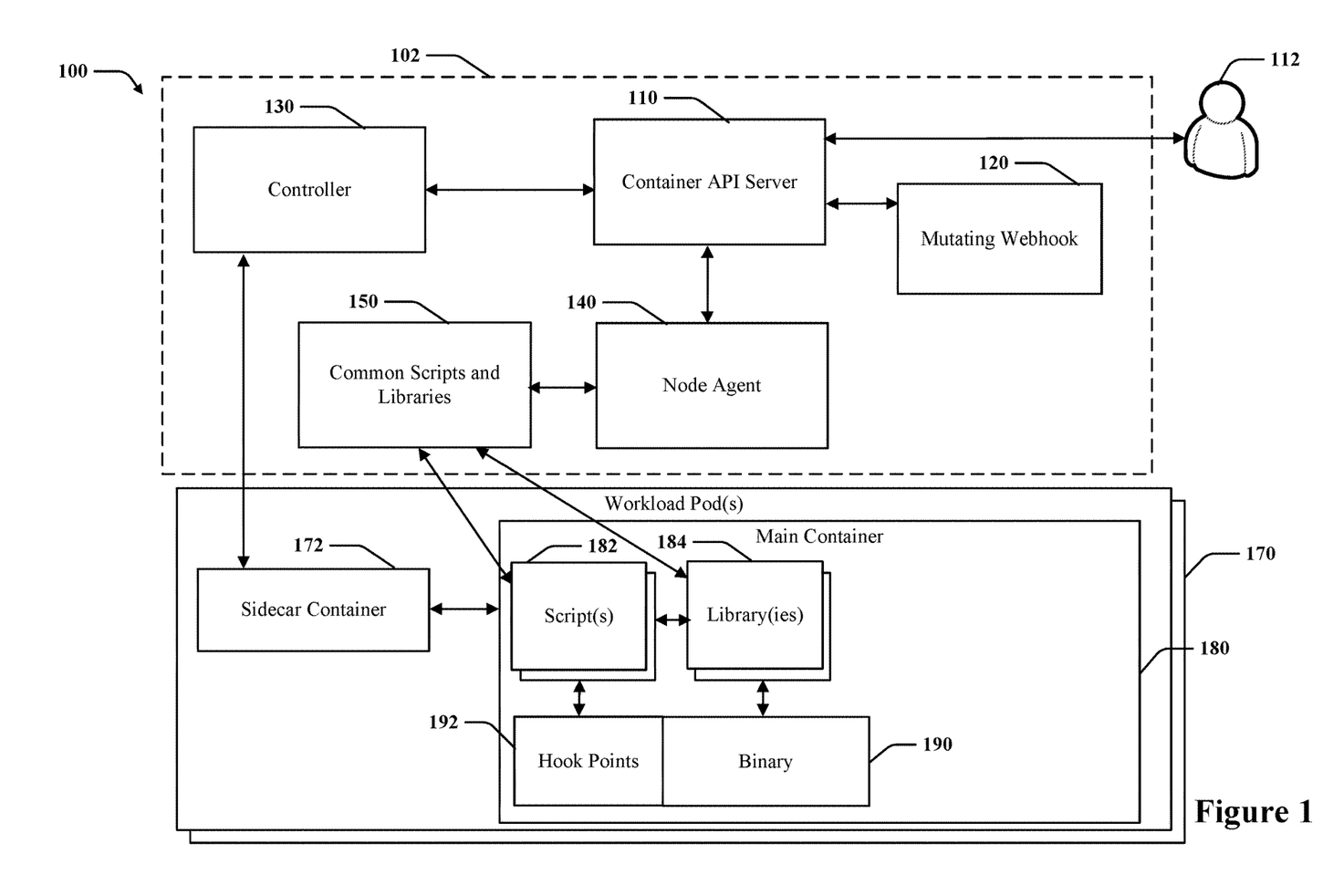
FIG. 1 is a diagram of an example architecture for deploying workloads in a container orchestration system for a cloud-computing environment, in accordance with aspects described herein.
Figure 2:
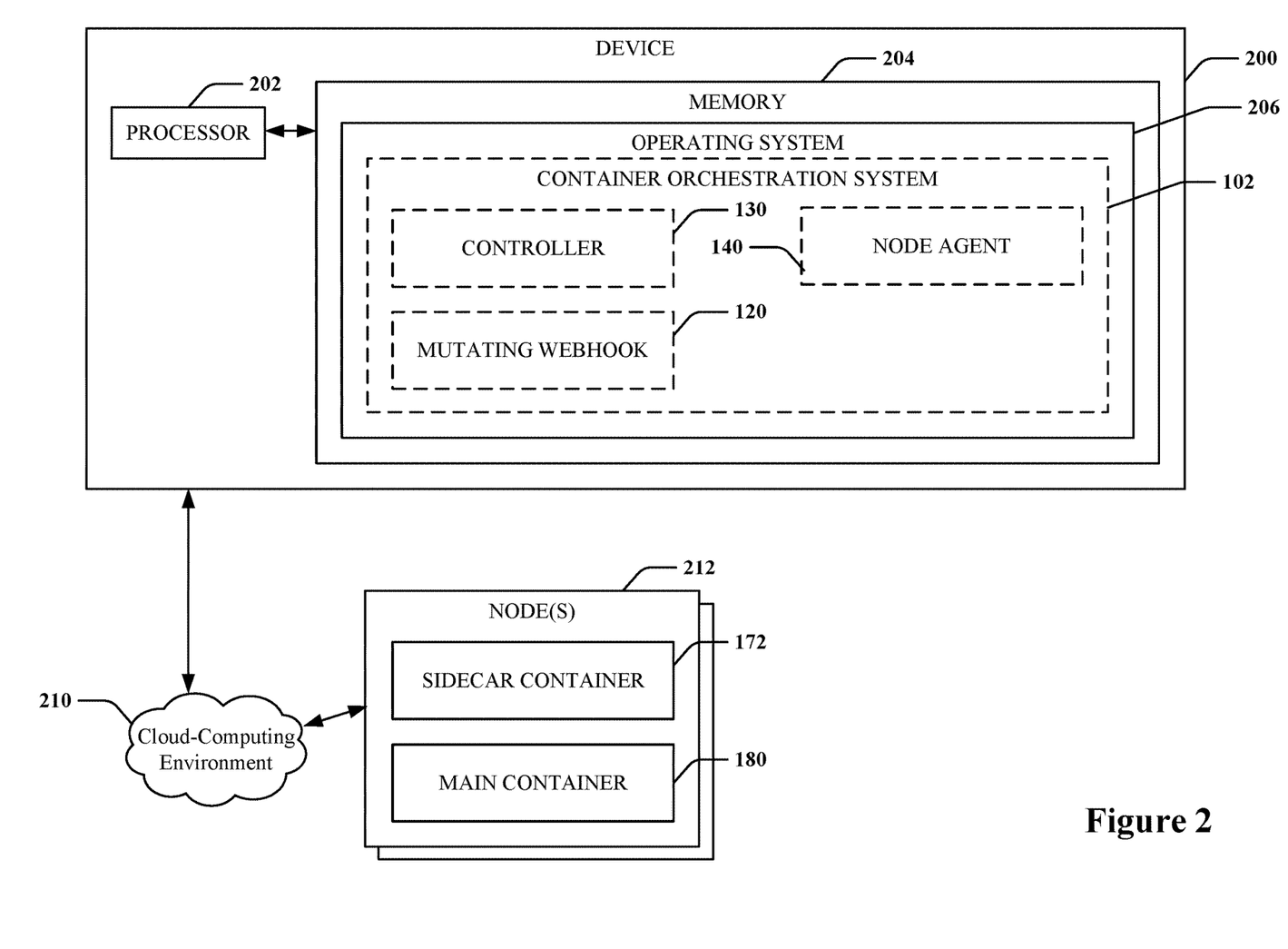
FIG. 2 is a schematic diagram of an example of a device for performing functions related to deploying or managing workloads over nodes of a cloud-computing environment, in accordance with aspects described herein.
Figure 3:
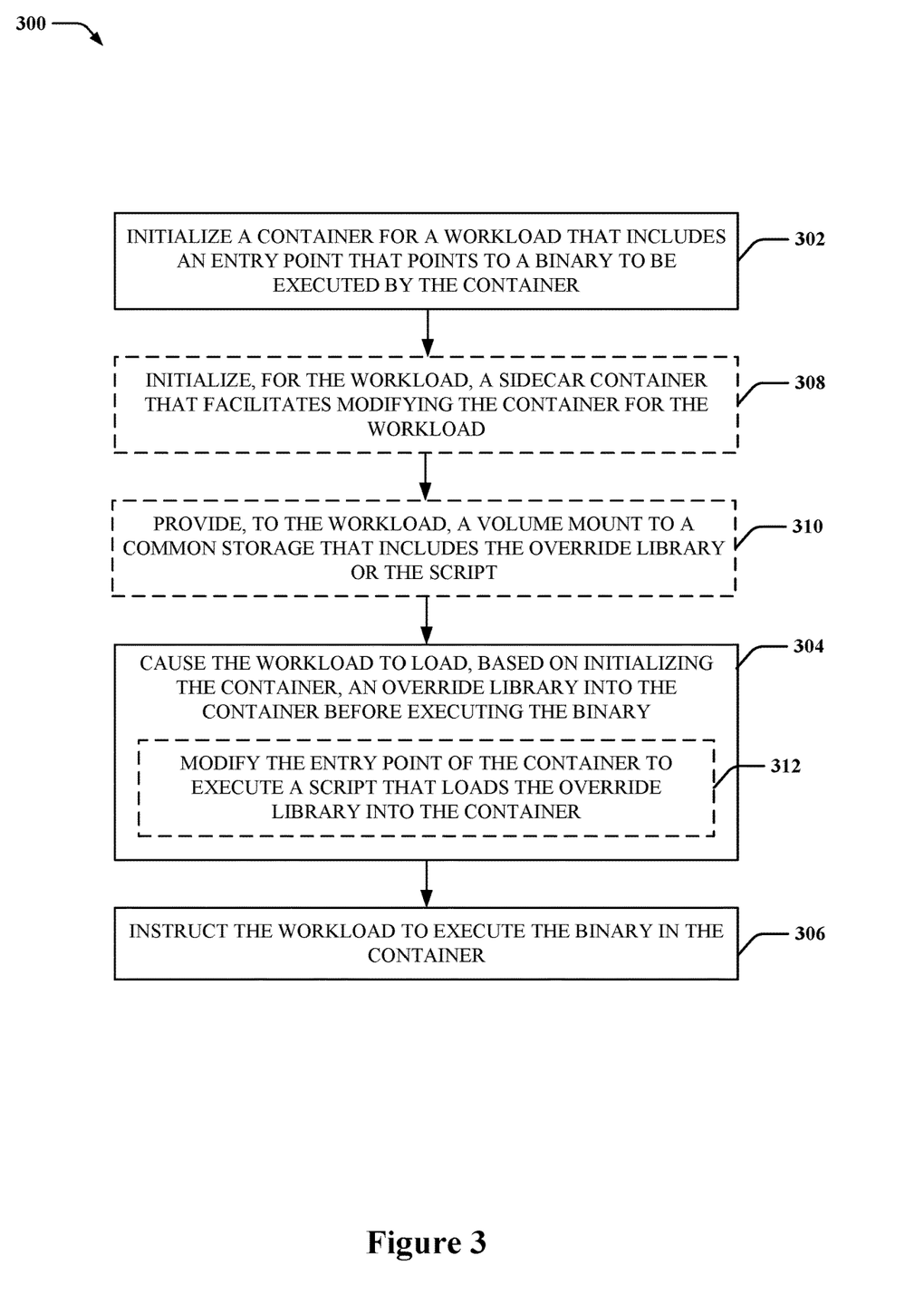
FIG. 3 is a flow diagram of an example of a method for loading an override library for a workload in a cloud-computing environment, in accordance with aspects described herein.

Turning now to FIGS. 1-4, examples are depicted with reference to one or more components and one or more methods that may perform the actions or operations described herein, where components and/or actions/operations in dashed line may be optional. Although the operations described below in FIG. 3 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 illustrates an example architecture 100 for deploying workloads in a container orchestration system 102 for a cloud-computing environment. For example, the container orchestration system 102 may be a Kubernetes system that executes binaries (e.g., as applications, services, codelets, etc.) within containers that are grouped into workload pods. In some specific non-limiting implementations, the applications or services may be, or may include, RAN functions. The architecture 100 includes a container application programing interface (API) server 110, a mutating webhook 120, a controller 130, a node agent 140, and one or more workload pods 170. The components of the example architecture 100, as described herein, may be provided by, or within, a cloud-computing environment (e.g., over various nodes in the cloud-computing environment).

In one example, the container API server 110 may receive and process instructions for configuring containers for execution (e.g., from a user 112 or other entity). For example, the container API server 110 may receive a configuration for a container image, which may specify various parameters for initializing and/or activating a binary, which may be part of the container image. In some implementations, the configuration may be a yet-another-markup-language (YAML) file or JavaScript Object Notation (JSON) file specifying container properties and resources. The configuration may include a header indicating dynamic loading of the binaries. The container API server 110 may control the controller 130 and node agent 140 to instantiate a main container 180 within a workload pod 170 and provide resources for the main container 180 for executing the binary.

The mutating webhook 120 may be configured (e.g., via computer-executable code or otherwise) for modifying the configuration of a container image (e.g., without user interaction). For example, the mutating webhook 120 may modify the configuration to add capabilities for the main container 180 to dynamically load the binary. For instance, the mutating webhook 120 may add a sidecar container 172 to the main container 180 for the container image, which can allow the controller 130 to communicate with the main container 180. The mutating webhook 120 may mount one or more scripts 182 or libraries 184 into the main container 180. The scripts 182 or libraries 184 may define functions associated with hook points 192 within the binary 190. The mutating webhook 120 may modify an entry point for the main container to run a script 182 that loads the one or more libraries 184. For example, the scripts 182 or libraries 184 may be defined by common scripts and libraries 150. In addition, for example, the common scripts and libraries 150, or the scripts 182 or libraries 184 loaded in the main container, may include one or more of an override library for overriding one or more libraries called by the binary 190, a script for loading the override library, etc.

The controller 130 may be configured (e.g., via computer-executable code or otherwise) for controlling workload pods 170 and containers including main containers 180 and sidecar containers 172. According to specific aspects described herein, controller 130 can control multiple workload pods 170, including a workload pod 170 for each of multiple active workloads and one or more workloads. For example, controller 130 can activate multiple active workload pods 170, which may be workloads of the same or different process (e.g., executing a same binary based on different environment variable configurations or executing a different binary, etc.).

As described above and further herein, in one example, the mutating webhook 120 can modify the entry point of the workload pod 170 to point to a script 182 that loads an override library 184 before executing the binary 190. The override library 182 can override one or more libraries that are called by the binary 190. Overriding the one or more libraries can include providing one or more override functions that have a same function signature as one or more of the functions in the one or more libraries being overridden. After the override library 184 is loaded, the binary 190 can be executed. In one example, the script 182 can cause the binary 190 to execute.

FIG. 2 is a schematic diagram of an example of a device 200 (e.g., a computing device) for performing functions related to deploying or managing workloads over nodes of a cloud-computing environment. In an example, device 200 can include a processor 202 and/or memory 204 configured to execute or store instructions or other parameters related to providing an operating system 206, which can execute one or more applications or processes, such as, but not limited to, one or more components of a container orchestration system 102, such as, but not limited to, a controller 130 for controlling one or more workloads, a mutating webhook 120 for modifying one or more workloads, a node agent 140 for instantiating a main container of one or more workloads, etc., as described above and further herein. For example, processor 202 and memory 204 may be separate components communicatively coupled by a bus (e.g., on a motherboard or other portion of a computing device, on an integrated circuit, such as a system on a chip (SoC), etc.), components integrated within one another (e.g., processor 202 can include the memory 204 as an on-board component), and/or the like. Memory 204 may store instructions, parameters, data structures, etc. for use/execution by processor 202 to perform functions described herein.

In an example, container orchestration system 102 can deploy workloads over nodes of a cloud-computing environment 210 (e.g., one or more nodes 212). For example, the node(s) 212 over which a given workload is deployed can include, for the workload, a sidecar container 172 and/or main container 180. In some examples, though shown on a single device 200 for ease of explanation, container orchestration system 102, and/or one or more components thereof, may be implemented by multiple devices distributed in a network (e.g., cloud-computing environment 210) such that different devices may provide the different functions of mutating webhook 120, controller 130, or node agent 140, as described herein, and/or a given component may be implemented over multiple devices or other resources that are coupled in the cloud-computing environment 210 (e.g., as sharing memory, processing resources, and/or the like). In a similar example, device 200 may include multiple devices, where the processor 202 and/or memory 204 can be shared or provided by pooled resources of the multiple devices.

FIG. 3 is a flowchart of an example of a method 300 for loading an override library for a workload in a cloud-computing environment. For example, method 300 can be performed by a device 200 and/or one or more components thereof to facilitate workload deployment or management in a cloud-computing environment.

In method 300, at action 302, a container for a workload that includes an entry point that points to a binary to be executed by the container can be initialized. In an example, node agent 140 of a container orchestration system 102, e.g., in conjunction with processor 202, memory 204, operating system 206, etc., can initialize the container (e.g., the main container 180) for the workload that includes the entry point that points to the binary to be executed by the container. For example, node agent 140, and/or one or more other components of the container orchestration system 102, can initialize the container by setting up the container framework, which may include performing various initialization processes for the workload.

For example, the node agent 140 may can setup the main container 180 for the workload, which may include finding a location in a compute cluster to launch the workload, writing a binding to the compute cluster to a store to cause a process to access the workload, accessing a container registry to check for a new image for the workload and downloading/installing the new image if available, provisioning a process namespace and network namespace for isolating the main container 180, provisioning a volume mount for the main container 180, etc. As described, for example, node agent 140 can perform the various processes to initialize the main container 180.

In method 300, at action 304, the workload can be caused to load, based on initializing the container, an override library into the container before executing the binary. In an example, mutating webhook 120 of the container orchestration system 102, e.g., in conjunction with processor 202, memory 204, operating system 206, etc., can cause the workload to load, based on initializing the container, the override library into the container before executing the binary. For example, mutating webhook 120 can load the override library 184 in the main container 180, where the override library can be obtained from the common scripts and libraries 150 stored by the container orchestration system 102. As described, for example, the override library can include an override function that overrides a function of the one or more libraries to be overridden. The override function can include a function signature that matches the function of the one or more libraries, and can be loaded in front of the function of the one or more libraries, such that when binary 190 calls the function, it calls the override function.

In one example, loading the override library can be optional and/or may be based on a configuration. For example, the configuration, which may be received by the container API server 110 (e.g., a YAML or JSON specifying container properties and resources) may indicate a parameter or option to enable (or disable) loading the override library. In one specific non-limiting example, the configuration may indicate to enable DPDK, based on which the mutating webhook 120 may cause the workload to load the DPDK override library that overrides functions in the sockets (e.g., UDP) library, as described above and further herein. In another example described herein, whether to use the override functions in the override library can be indicated by using certain parameter values in the function call. For example, using a certain network interface of a socket in a send function or receive function for an override library that overrides a sockets library can cause using the override function over the function in the one or more libraries to be overridden by the override function.

In another example, loading the override library can be based on a parameter used to modify a functionality of the override library. For example, the configuration, which may be received by the container API server 110 (e.g., a YAML or JSON specifying container properties and resources) may indicate a parameter or option to modify functionality of the override library. In one specific non-limiting example, the configuration may indicate a communication type parameter as one of UDP, DPDK, RDMA, etc., and the mutating webhook 120 may cause the workload to load the override library specifying the communication type parameter. The override library can perform different functions based on the parameter (e.g., to use UDP where the parameter indicates UDP, to use DPDK where the parameter indicates DPDK, to use RDMA where the parameter indicates RDMA, etc.). In an example, container API server 110 can indicate the parameter to controller 130, which can communicate the parameter to sidecar container 172. Sidecar container 172, in this example, can provide the parameter to script 182, to cause the script 182 to load the override library with the appropriate parameter.

In method 300, at action 306, the workload can be instructed to execute the binary in the container. In an example, controller 130 of the container orchestration system 102, e.g., in conjunction with processor 202, memory 204, operating system 206, etc., can instruct the workload to execute the binary in the container. For example, controller 130 can instruct the workload, via sidecar container 172, to execute the binary 190 in the main container 180 after the override library is loaded. In this regard, for example when the binary 190 calls a function from the one or more libraries that are overridden, the call may be instead to the override function in the override library.

In one example in method 300, optionally at action 308, a sidecar container that facilitates modifying the container for the workload can be initialized for the workload. In an example, mutating webhook 120 of the container orchestration system 102, e.g., in conjunction with processor 202, memory 204, operating system 206, etc., can initialize, for the workload, the sidecar container (e.g., sidecar container 172) that facilitates modifying the container for the workload. In an example, mutating webhook 120 can initialize a sidecar container 172 for each workload that is managed by the controller 130. Mutating webhook 120 can initialize the sidecar container 172 without user interaction, and may do so when the workload is initialized by the node agent 140 (e.g., based on a request from the node agent 140, based on receiving instructions for configuring the workload, etc.). In a specific non-limiting example, mutating webhook 10 can initialize the sidecar container 172 based on, or based on the container orchestration system 102 receiving, the YAML or JSON configuration for the workload. In any case, for example, controller 130 can use the sidecar container 172 to communicate with the main container 180 such to modify the entry point of the main container 180 to point to a script for loading the override library (e.g., instead of pointing to the binary). For example, the sidecar container 172 can include a process that executes along with the main container 180 that can call functions of the main container 180 to communicate therewith and expose functions (e.g., via a representational state transfer (REST) API, remote procedure call (RPC), etc.) to the controller 130 to facilitate communicating with the main container 180.

In an example, the script(s) 182 and/or library(ies) 184 may be specified in a store for common scripts and libraries in the container orchestration system 102 (e.g., common scripts and libraries 150). Thus, in an example in method 300, optionally at action 310, a volume mount to a common storage that includes the override library or the script can be provided to the workload. In an example, mutating webhook 120 of the container orchestration system 102, e.g., in conjunction with processor 202, memory 204, operating system 206, etc., can provide, to the workload, the volume mount to the common storage (e.g., common scripts and libraries 150) that includes the override libraries or the script. For example, mutating webhook 120 can mount the volume for the workload (e.g., in the main container 180 by communicating with the sidecar container 172), so that the main container 180 can access the script 182, load the override library 184, etc. In this regard, for example, mutating webhook 120 can modify the entry point of the main container 180 to point to the script 182 as stored in the volume mount to the common storage.

In causing the workload to load the override library at action 304, optionally at action 312, the entry point of the container can be modified to execute a script that loads the override library into the container. In an example, mutating webhook 120 of the container orchestration system 102, e.g., in conjunction with processor 202, memory 204, operating system 206, etc., can modify the entry point of the container to execute the script 182 that loads the override library 184 into the main container 180 in front of one or more libraries leveraged by the binary 190. In one example, mutating webhook 120 can modify the entry point of the main container 180 to point to the script by using the sidecar container 172 to communicate with the main container 180. For example, mutating webhook 120 can overwrite a field in the YAML or JSON that indicates the binary 190 to instead point to the script 182. As described above, mutating webhook 120 can also provide the volume mount to the common storage to the workload so the script is available inside the main container 180.

In one specific non-limiting example, the binary 190 can leverage a sockets library, and the override library 184 can have one or more functions to override the functions of the sockets library, such as the send function, the receive function, the socket function, and/or the bind function. Accordingly, when the binary 190 calls one of these functions, the override functions of the override library 184 get called instead, and can perform different functionality using a different mechanism. For example, where the override library uses DPDK, the send function, the receive function, the socket function, and/or the bind function can be overridden to use DPDK instead of UDP. Thus, when the binary calls the functions, DPDK can be used instead of UDP, which can improve network connectivity performance when executing the binary 190.

In a specific non-limiting example, controller 130 can notify the workload pods 180 of target destinations (e.g., other workload pods 180) and/or can map network addresses, localhost ports, etc. to these target destinations. In this example, the override library, as part of override functions, can overwrite destination addresses with the correct location of the target destination. In addition, in an example, the controller 130 can control the mechanism used by the override library, such as whether to use UDP, DPDK, RMDA, shared memory, etc. In one example, controller 130 can control the override library that is loaded in the main container 180 to use one of UDP, DPDK, RMDA, shared memory, etc.

In one example, after the application (e.g., binary 190) has been started, the sidecar container 172 may directly signal to the override library to dynamically modify its functionality. This modification can be in response to relocation of the workload pod 182 where the traffic is being sent to another node. For example, the routing of the send request to a different workload, as described below, may change due to the location of the different workload changing. Furthermore, the dynamic modification of the override library can be in response to the user changing the setting to use a different functionality (e.g., RDMA as opposed to DPDK).

In this example, the override library 184 can allow for one or more of the following capabilities. For example, the override library can override a send function to route a send specifying a given port on localhost (e.g. 127.0.01:4000) to a certain workload pod 180 (and/or a certain network interface of the workload pod 180). In one example, the override library 184 can use labels and other metadata to identify the target workload. Multiple such destinations can be provided allowing for load balancing among the workloads. The controller 130 can keep track of this identification and updates this information to the sidecar containers 172 of the workload pods 180, which then communicates it to the override library 184.

Furthermore, in an example, a send function or receive function using a socket that is bound to a particular network interface can trigger using the override library 184 and/or the corresponding override function in the override library 184. For example, specifying a socket bound to the IP address corresponding to networking interface "eth1" can indicate to call the override function for send or receive instead of the normal function in the sockets library. Send or receive functions using these sockets can use alternate accelerated implementations to achieve ultra-low latency. The behavior implementation used by this socket can be controlled by communication between the controller 130 and the sidecar container 172, as described above. In Kubernetes, for example, a configuration can annotate the workload pod 180. The controller 130 can pick up this annotation, and can communicate it to the sidecar container 172, which then communicates the desired implementation to use to the override networking library. For example, standard UDP send/receive functions can be used, DPDK can be used, RDMA can also be used (lossless or lossy RDMA), shared memory can also be used if both source and destination are on same host, etc.

For example, if workload1 sends to workload2, it can send to localhost: 4000 (without knowing exact location of workload2). Using annotations, it can state that all data sent to port 4000 on localhost is to be rerouted to a workload with certain labels (or to a specific interface on this workload or corresponding node). The controller 130 can convey to the sidecar container 172 on workload1, which then conveys to the override networking library the exact location of the workload(s) that meet the desired criteria (labels). The networking override library can overwrite all packets sent to port 4000 on localhost with the correct IP/MAC address. Furthermore, the implementation of the networking calls made by workload1 can be controlled. Send and receive function calls made on a socket bound to a particular IP address may use alternate implementations.

Figure 4:
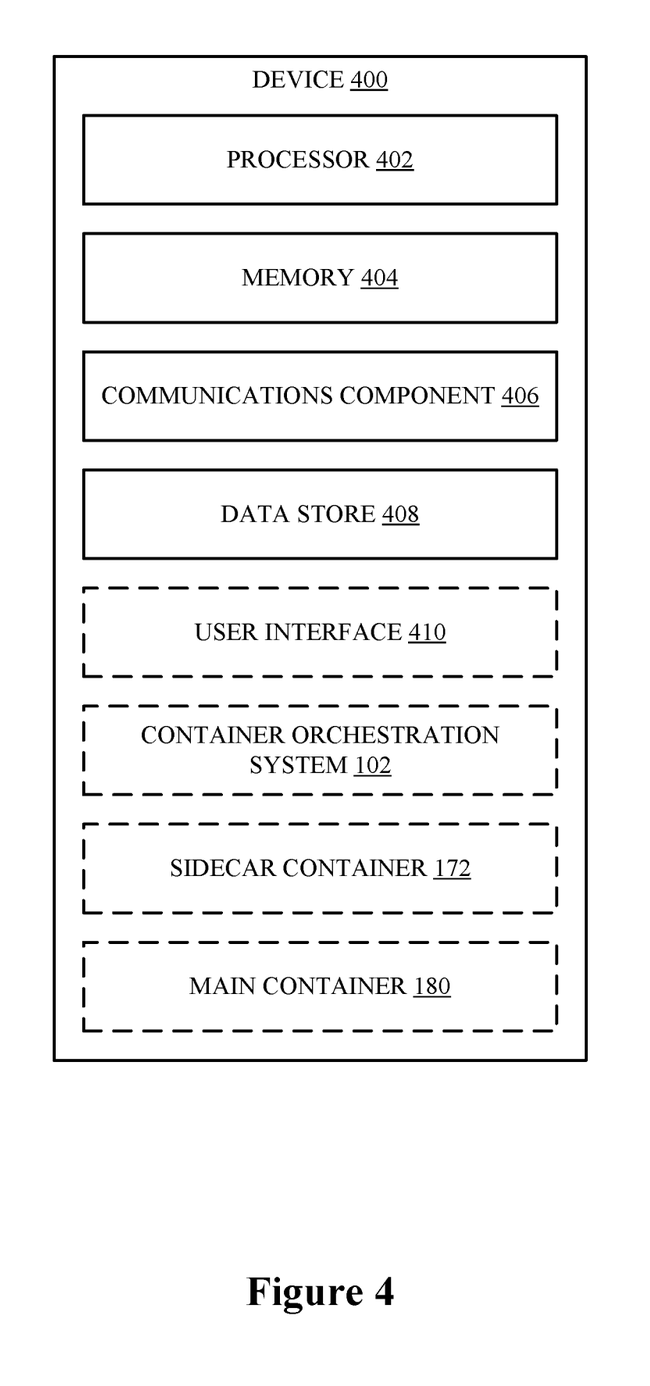
FIG. 4 is a schematic diagram of an example of a device for performing functions described herein, in accordance with aspects described herein.

FIG. 4 illustrates an example of device 400 including additional optional component details as those shown in FIG. 2. In one aspect, device 400 may include processor 402, which may be similar to processor 202 for carrying out processing functions associated with one or more of components and functions described herein. Processor 402 can include a single or multiple set of processors or multi-core processors. Moreover, processor 402 can be implemented as an integrated processing system and/or a distributed processing system.

Device 400 may further include memory 404, which may be similar to memory 204 such as for storing local versions of operating systems (or components thereof) and/or applications being executed by processor 402, such as a container orchestration system 102, sidecar container 172, main container 180, etc. Memory 404 can include a type of memory usable by a computer, such as random access memory (RAM), read only memory (ROM), tapes, magnetic discs, optical discs, volatile memory, non-volatile memory, and any combination thereof.

Further, device 400 may include a communications component 406 that provides for establishing and maintaining communications with one or more other devices, parties, entities, etc. utilizing hardware, software, and services as described herein. Communications component 406 may carry communications between components on device 400, as well as between device 400 and external devices, such as devices located across a communications network and/or devices serially or locally connected to device 400. For example, communications component 406 may include one or more buses, and may further include transmit chain components and receive chain components associated with a wireless or wired transmitter and receiver, respectively, operable for interfacing with external devices.

Additionally, device 400 may include a data store 408, which can be any suitable combination of hardware and/or software, that provides for mass storage of information, databases, and programs employed in connection with aspects described herein. For example, data store 408 may be or may include a data repository for operating systems (or components thereof), applications, related parameters, etc.) not currently being executed by processor 402. In addition, data store 408 may be a data repository for container orchestration system 102, sidecar container 172, main container 180, and/or one or more other components of the device 400.

Device 400 may optionally include a user interface component 410 operable to receive inputs from a user of device 400 and further operable to generate outputs for presentation to the user. User interface component 410 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 410 may include one or more output devices, including but not limited to a display, a speaker, a haptic feedback mechanism, a printer, any other mechanism capable of presenting an output to a user, or any combination thereof.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for overriding a library used by a workload in a cloud-computing environment, comprising:
   initializing a container for a workload that includes an entry point that points to a binary to be executed by the container;
   modifying, based on initializing the container, the entry point of the container that points to the binary to instead point to a script, wherein the script loads an override library into the container before execution of the binary, wherein the override library includes an override function having a function signature of a function provided by the library; and
   instructing, based on executing the script, the workload to execute the binary in the container, wherein the binary calls the function using the function signature causing the override function in the override library to be called in place of the function.

2. The computer-implemented method of claim 1, wherein the override library is a network communication library that overrides at least a send function and a receive function of the library.

3. The computer-implemented method of claim 2, wherein the override library further overrides a socket function and a bind function of the library, wherein the library is a user datagram protocol (UDP) sockets library.

4. The computer-implemented method of claim 3, wherein the override library provides the override function to override at least one of the send function, the receive function, the socket function, or the bind function to use a network communication protocol other than UDP.

5. The computer-implemented method of claim 4, wherein the network communication protocol includes at least one of data plane development kit (DPDK), a remote direct memory access (RDMA), a shared memory, to perform the function.

6. The computer-implemented method of claim 2, wherein the send function, as overridden in the override library, routes a send request for a port on localhost to a different workload.

7. The computer-implemented method of claim 6, wherein a sidecar container maps the port on localhost to the different workload.

8. The computer-implemented method of claim 1, wherein loading the override library is based on a parameter in a workload configuration used in initializing the container for the workload.

9. A device for overriding a library used by a workload in a cloud-computing environment, comprising:
   a memory storing one or more parameters or instructions for deploying workloads in the cloud-computing environment; and
   at least one processor coupled to the memory, wherein the at least one processor is configured to:
      initialize a container for a workload that includes an entry point that points to a binary to be executed by the container;
      modifying, based on initializing the container, the entry point of the container that points to the binary to instead point to a script, wherein the script loads an override library into the container before execution of the binary, wherein the override library includes an override function having a function signature of a function provided by the library; and
      instruct, based on executing the script, the workload to execute the binary in the container, wherein the binary calls the function using the function signature causing the override function in the override library to be called in place of the function.

10. The device of claim 9, wherein the override library is a network communication library that overrides at least a send function and a receive function of the library.

11. The device of claim 10, wherein the override library further overrides a socket function and a bind function of the library, wherein the library is a user datagram protocol (UDP) sockets library.

12. The device of claim 11, wherein the override library provides the override function to override at least one of the send function, the receive function, the socket function, or the bind function to use a network communication protocol other than UDP.

13. The device of claim 12, wherein the network communication protocol includes at least one of data plane development kit (DPDK), a remote direct memory access (RDMA), a shared memory, to perform the function.

14. The device of claim 10, wherein the send function, as overridden in the override library, routes a send request for a port on localhost to a different workload.

15. The device of claim 14, wherein a sidecar container maps the port on localhost to the different workload.

16. The device of claim 9, wherein the at least one processor is configured to load the override library based on a parameter in a workload configuration used in initializing the container for the workload.

17. A non-transitory computer-readable medium storing instructions thereon that, when executed by at least one computing device, causes the at least one computing device to perform operations for overriding a library used by a workload in a cloud-computing environment, comprising:
  initializing a container for a workload that includes an entry point that points to a binary to be executed by the container;
  modifying, based on initializing the container, the entry point of the container that points to the binary to instead point to a script, wherein the script loads an override library into the container before execution of the binary, wherein the override library includes an override function having a function signature of a function provided by the library; and
  instructing, based on executing the script, the workload to execute the binary in the container, wherein the binary calls the function using the function signature causing the override function in the override library to be called in place of the function.

18. The non-transitory computer-readable medium of claim 17, wherein the override library is a network communication library that overrides at least a send function and a receive function of the library.

19. The non-transitory computer-readable medium of claim 18, wherein the override library further overrides a socket function and a bind function of the library, wherein the library is a user datagram protocol (UDP) sockets library.

20. The non-transitory computer-readable medium of claim 19, wherein the override library provides the override function to override at least one of the send function, the receive function, the socket function, or the bind function to use a network communication protocol other than UDP.

* * * * *

UNITED STATES PATENT AND TRADEMARK OFFICE
CERTIFICATE OF CORRECTION

| | | |
|---|---|---|
| PATENT NO. | : 11,838,354 B1 | Page 1 of 1 |
| APPLICATION NO. | : 17/804737 | |
| DATED | : December 5, 2023 | |
| INVENTOR(S) | : Sanjeev Mehrotra | |

It is certified that error appears in the above-identified patent and that said Letters Patent is hereby corrected as shown below:

On the Title Page

Please insert the following after item (22):
-- (65) Prior Publication Data
US 2023/0388369 A1 Nov. 30, 2023 --.

Signed and Sealed this
Fifth Day of November, 2024

Katherine Kelly Vidal
*Director of the United States Patent and Trademark Office*